United States Patent [19]

Jeffery et al.

[11] Patent Number: 4,697,419

[45] Date of Patent: Oct. 6, 1987

[54] FAST ACTUATOR

[75] Inventors: Jon R. Jeffery, Alton, Ill.; Neil J. Pierce, St. Charles, Mo.

[73] Assignee: McDonnell Douglas Corporation, St. Louis, Mo.

[21] Appl. No.: 852,267

[22] Filed: Apr. 14, 1986

[51] Int. Cl.[4] .......... F16D 31/02

[52] U.S. Cl. .......... 60/464; 91/436

[58] Field of Search .......... 60/464; 92/436

[56] References Cited

U.S. PATENT DOCUMENTS

| | | | |
|---|---|---|---|
| Re. 29,481 | 11/1977 | Larner | 137/596.15 |
| 2,802,337 | 8/1957 | Bunch | 60/464 X |
| 3,370,423 | 2/1968 | Vaughan | 60/464 X |
| 4,084,605 | 4/1978 | Franz | 137/114 |

*Primary Examiner*—Harold W. Weakley

*Attorney, Agent, or Firm*—Paul T. Loef; George W. Finch; Donald L. Royer

[57] ABSTRACT

A hydraulic power actuator system flow augmentation scheme of the boot-strap type. The scheme consists of a jet pump to augment pump inlet flow with return flow by reducing the pressure in the jet pump below return pressure. A check valve is installed in the augmentation circuit to prevent back-flow during low flow rate conditions. Two load recovery check valves are used to short circuit the actuator during aiding load conditions.

8 Claims, 9 Drawing Figures

JET PUMP TEST RESULTS

JET PUMP TEST RESULTS

JET PUMP TEST RESULTS

LOAD RECOVERY VALVES TEST RESULTS

FAST ACTUATOR

BACKGROUND OF THE INVENTION

This invention pertains to fluid system augmentation (particularly pertinent to aircraft type hydraulic systems) and more particularly to augmentation systems of a bootstrap type wherein augmentation is provided to valve controlled power actuators by the addition of a jet pump or ejector in combination with means to use the aiding load generated pressure differential in the power actuator.

While the schematics and sketches shown and discussed herein are directed to aircraft type servo applications, the teachings of this invention apply equally well to any valve controlled actuator which sees both aiding and resisting loads. FIG. 1 is illustrative of a typical prior art aircraft power actuator system showing a conventional single-stage single system servoactuator hydraulic subsystem schematic. System pressure and flow is diverted to one side of the actuator by commanding the force motor 5 to drive the main control valve (MCV) 7 in the appropriate direction. If a large aiding load were applied on the actuator at F, the system pump would have to supply sufficient flow in chamber B to avoid cavitating that side of the power actuator since the aiding load supplies the motive force to deflect the control surface.

One alternative is to restrict the flow out of chamber A which, of course, slows down the actuator. A further alternative known in the art is to short circuit chamber A to chamber B when chamber A pressure exceeds the pressure in chamber B. This is done either directly or through the control valve by connecting chamber A to chamber B with a check valve allowing flow from A to B but not from B to A. Since the MCV directs system pressure and flow to either chamber, chamber A may become the pressure chamber and chamber B return, so there has to be another line interconnecting the chambers with a check valve which allows flow from chamber B to chamber A but not from A to B. These check valves are shown in two alternate schemes in FIGS. 2 and 3 as valves 9 and 11 with associated plumbing. These valves are ordinary check valves and are sometimes referred to in the aircraft industry as "run-around" check valves when installed as indicated to avoid cavitating the pressure-side chamber of a power actuator experiencing high velocity rates. They will be referred to hereinafter as load recovery valves (LRV) to avoid confusion with other check valves in the circuit.

The dotted line curve of FIG. 9 shows the comparative actuator velocity, expressed as a percent of no load steady state velocity, against the percent of maximum load with the use of the load recovery valves as compared to the solid line without the load recovery valves. While this velocity increase is substantial, it is experienced only with an aiding load above 20% maximum. While the load recovery valves provide a definite flow enhancement, it is experienced only over a narrow part of the loading regime and is inadequate, in most cases, by itself to allow reduction in the system pump size.

It is an object of the present invention to further increase the flow enhancement and to spread the enhancement over a greater portion of the actuator load regime so as to permit a reduction in the system pump size and as a result to reduce the heat generated by the smaller pump and reduce system weight by reducing the size of the pump and the associated plumbing. It is an alternate object of the invention to augment flow so as to permit increasing actuator rates which is particularly applicable on redesigns or modifications of existing aircraft.

SUMMARY OF THE INVENTION

In summary, the above objectives are accomplished by providing in a power actuator system controlled by a control valve, directing pressure and flow to one side or the other of a power actuator an ejector or jet pump in combination with load recovery check valves. The jet pump is located at the inlet of the control valve and utilizes the flow exiting the control valve during high surface rate conditions to supplement the inlet flow. The system pump is connected to the primary side of the jet pump and the return line from the control valve to the secondary side of the jet pump through a check valve so as to prevent short circuiting directly to return. The primary flow is enhanced by locally accelerating the primary fluid, which reduces the pressure at the throat of the nozzle inside the jet pump, and causes the higher pressure return fluid to be drawn into and mixed with the primary pump flow. The jet pump will provide substantial flow augmentation from about 30% or 40% resisting actuator load to approximately 10% aiding actuator load. Load recovery check valves are provided which permit bypassing the flow from the actuator chamber being pressurized by the aiding load to the opposite chamber of the power actuator via the control valve. The load recovery valves provide full augmentation from approximately 10% of assisting load to 100% assisting load. The combined flow augmentation provided by the load recovery valves and the jet pump installed in the conventional power actuator system to provide the fast actuator of this invention is best shown in FIGS. 4 and 5 which compare fast actuators using 55% of system pump flow and 100% of system pump flow at no load. The jet pump and load recovery valves are used in a complementary manner since the jet pump may be optimally designed for resisting loads since the load recovery valves work only with assisting loads. Further, the jet pump by itself without the benefit of the load recovery valves would cavitate very badly in the high aiding load regions since the jet pump directs the primary flow through a nozzle which has a limiting or choke flow.

BRIEF DESCRIPTION OF THE DRAWINGS

With reference to the drawings, wherein like reference numerals designate like portions of the invention.

DESCRIPTION OF THE PREFERRED EMBODIMENT

Figure 1:
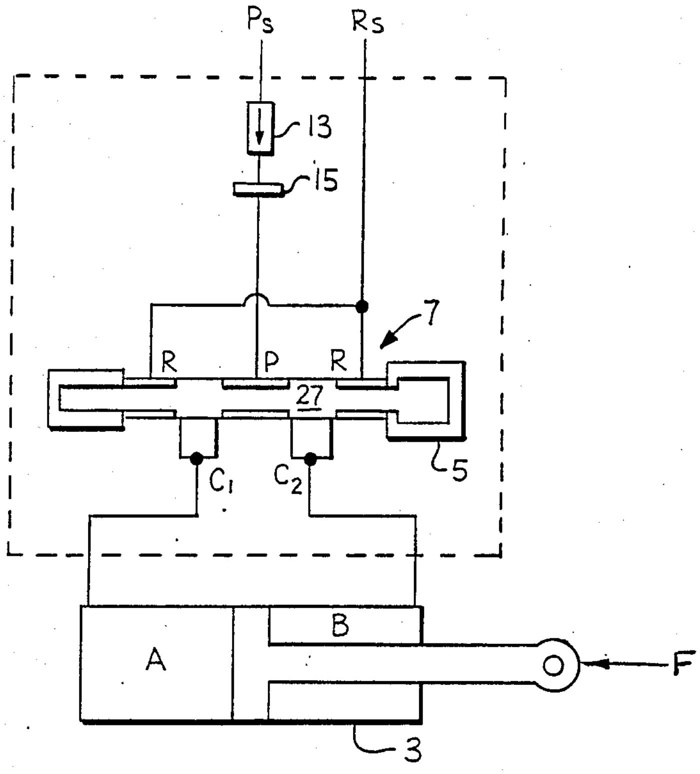
FIG. 1 PRIOR ART
FIG. 1 is a schematic showing a conventional single-stage, single system servoactuator hydraulic schematic known to the prior art.
Figure 2:
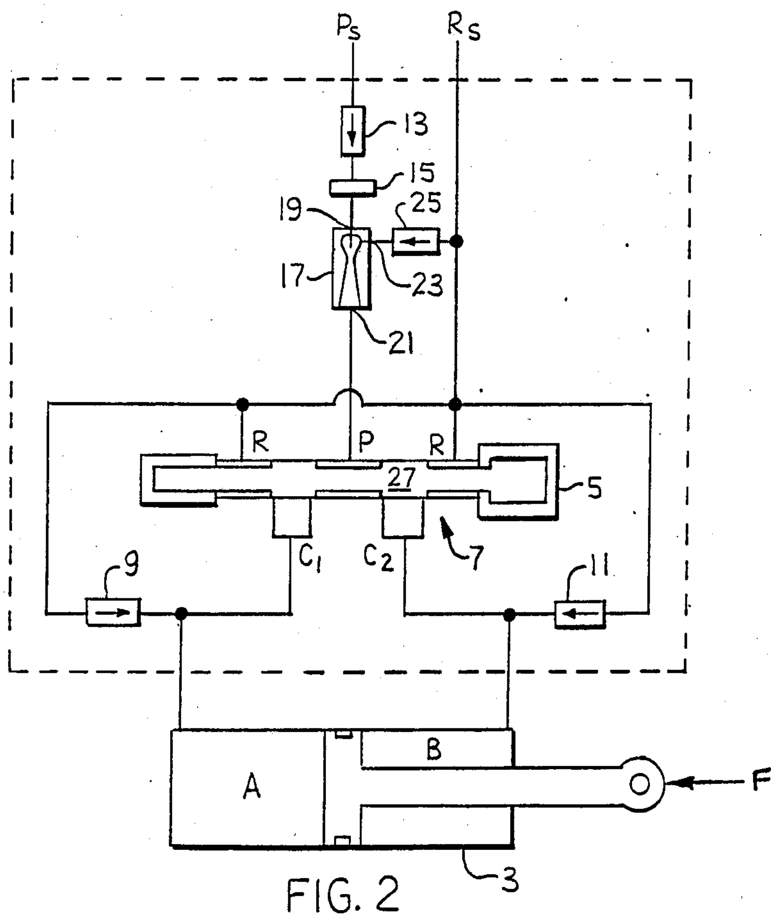
FIG. 2 is the schematic of FIG. 1 modified to add the jet pump and its connecting check valve on the secondary side along with the load recovery check valves allowing fluid to exit one side of the actuator and to be drawn into the other side.
Figure 3:
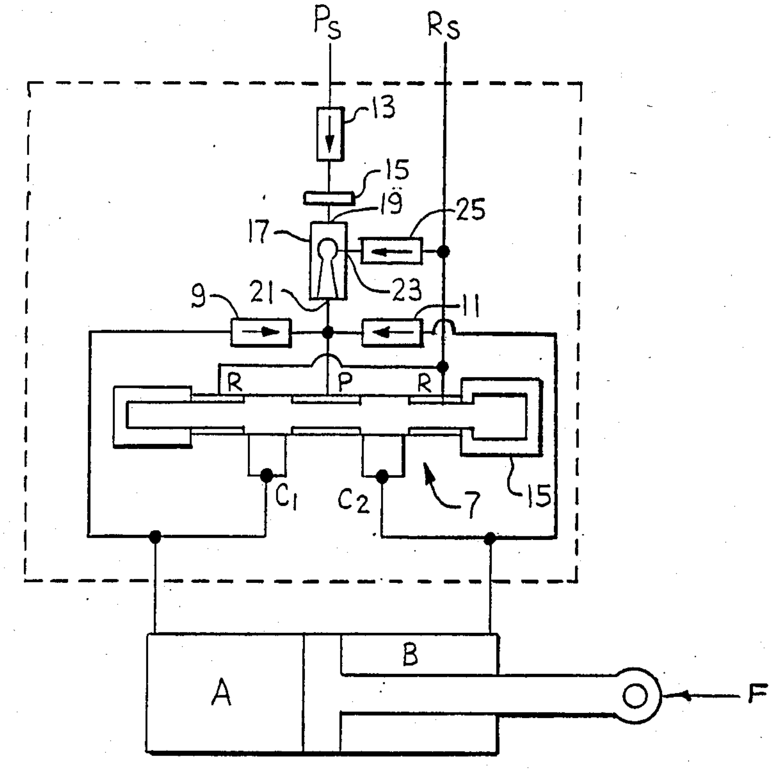
FIG. 3 is a schematic similar to FIG. 2 showing an alternate arrangement for the load recovery valves.

FIG. 2 shows a schematic of a power actuator system employing the teachings of this invention. Again, the schematic depicts an aircraft servo system. However, the teachings are applicable to any power actuator system employing a power actuator in combination with a control valve. System pressure is indicated as $P_s$ and return as $R_s$ in the single line schematic. The pump providing system pressure is a pressure compensated variable delivery pump typical of control systems for airplanes, submarines, and the like. Inlet check valve 13 is generally used to isolate the power actuator system so as to prevent an overriding load from driving the pump as a motor or another power actuator system which may be on the same pump system. A filter screen 15 is often used in the supply line to protect the valve and actuator. The next element is a jet pump or ejector 17 having a primary inlet port 19, an outlet port 21, and a secondary inlet port 23. A jet pump typically contains a divergent nozzle to which the primary flow is directed and produces a lower pressure, either at the throat or at the end of the diffuser, depending on the design, which causes a secondary fluid to be drawn into the device, and the momentum of the fast-moving jet of primary flow carries the secondary fluid into the diffuser where the velocity decreases and the pressure increases until the exit port is reached. The secondary port 23 is connected to the return side of the main control valve (MCV) 7 through another check valve 25 which permits flow into the jet pump but not back from the jet pump to the return line, as indicated in the schematic of FIG. 2. The MCV shown is a four-way spool and sleeve valve whose spool is displaced electrically by a torque motor 5. It shows a pressure port P, two return ports R and first and second load ports $C_1$ and $C_2$ which are, alternately, pressure and return, depending upon spool position. The conventional hookup of the prior art is shown in FIG. 1 while FIGS. 2 and 3 show alternate installations of the two load recovery check valves 9 and 11, which reflect the teachings of this invention. Port $C_1$ of the MCV 7 is connected to the extend side A of the power actuator 3 and load port $C_2$ is connected to the retract side B. Each side of the actuator, A and B, is also connected through check valves 9 and 11 to the respective return ports of the MCV and to system return $R_s$. Hence, if the spool 27 of the main control valve 7 is displaced so as to pressurize load port $C_2$ while $C_1$ goes to return, the B side of the actuator 3 is pressurized, retracting the actuator, while the A side is open to return. However, if an aiding load F is applied to the actuator as shown, the aiding load, if large, causes the pressure on the A side to be higher than the pressure on the B side. The exiting fluid is checked by check valve 9 and is directed through port $C_1$ to the return side of the MCV where it has a choice to go either to system return $R_s$ or may proceed around through check valve 11 back into the B side of actuator 3. The fluid bypassed actually does two things, prevents cavitation of the P side of the actuator and actually augments the pressure supplied from port $C_2$ to the B side of the actuator. Cavitation may be defined as the local formation and collapse of vapor bubbles caused by the lowering of the local pressure on the B side of the actuator because the aiding load drives the actuator faster than the incoming fluid. Obviously, the same result occurs, only on the opposite side of the actuator, if the valve spool is commanded to extend the actuator 3 while the aiding load is in the reverse direction.

The difference between FIGS. 2 and 3 is simply alternate methods of plumbing the load recovery check valves 9 and 11. In either case, the load recovery check valves ensure that the operating logic of the valve arrangement is such that the control valve position and the aiding load generated pressure differential is always appropriately matched before the bypass flow paths open.

Those skilled in the art of hydraulic system design will well appreciate that the system must be properly designed or "tuned" to provide proper pressure drops at different portions of the circuit. An asymmetric distribution system is required with minimal pressure drop between the pump outlet and the FAST Actuator and relatively high pressure drop between the FAST Actuator and pump suction side. This is required to achieve high return pressure at the jet pump secondary port which is the augmented port. Furthermore, the main control valve should have minimal pressure drop such as approximately 400 psid at no load flow between pressure and return ports of the valve. If the pressure drop across the valve is high at no load, the return side pressure at the jet pump secondary port will be low and, therefore, there will be low flow augmentation at actuator no load flow rates.

A jet pump is required for each actuator system (actuators controlled by a single control valve) to augment inlet flow with return flow by reducing the throat pressure in the jet pump below system return pressure. The jet pump should be designed for resisting actuator loads inasmuch as the load recovery valves readily care for the aiding load situation. The jet pump cannot be used without the aiding load recovery valves for an aiding load situation because the jet pump takes the primary flow through a divergent nozzle which has a maximum flow or choke condition, and the actuator would cavitate badly at aiding load conditions in the absence of the load recovery valves.

Figure 4:
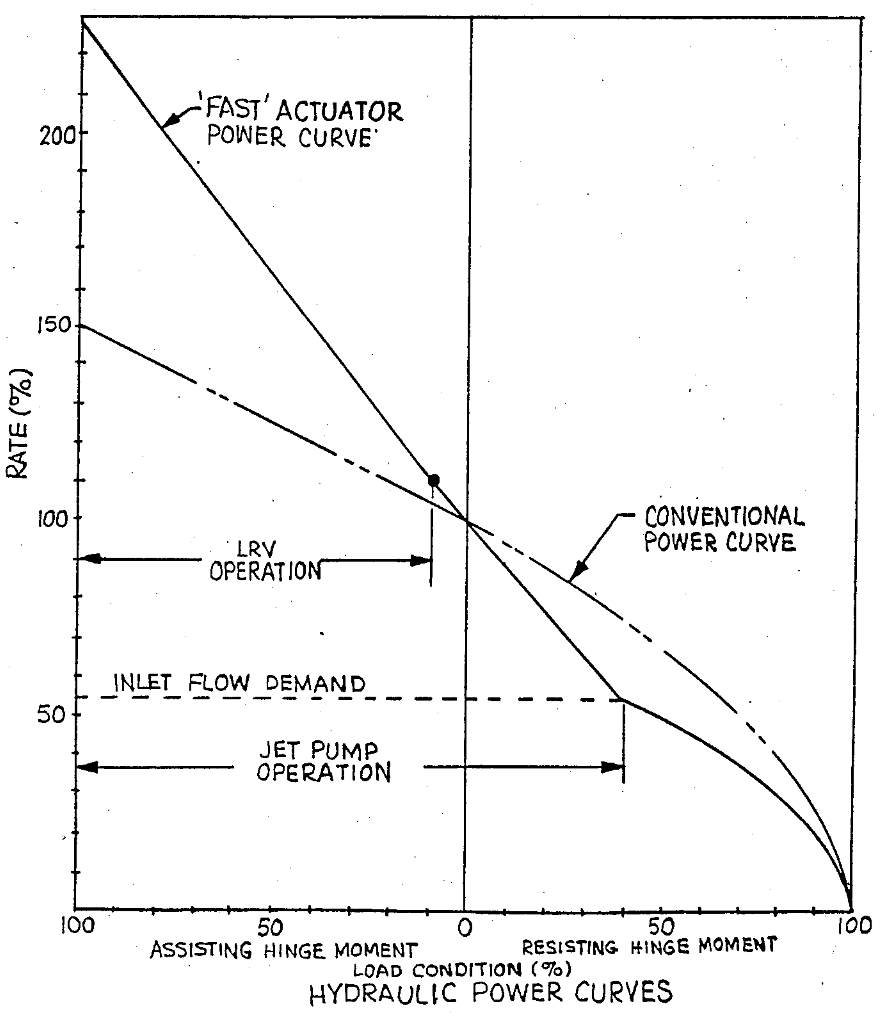
FIG. 4 illustrates a conventional servoactuator power curve versus the FAST Actuator power curve where the system is designed to meet the same no load surface rate condition which is designated 100% rate.

FIG. 4, Hydraulic Power Curves, illustrates the conventional servoactuator flow rate versus the FAST Actuator flow rate against load when both systems are designed to meet the same, predetermined no load surface rate condition. It is important to note that in the conventional actuator power curve, the entire flow demand is supplied by the system pump while in the FAST Actuator power curve, no more than 55% of no load flow is ever demanded from the system pump. Hence, with no load on the actuators, both systems deliver 100% system rate, but the FAST Actuator requires only 55% of the flow rate from the central system or pump. At 100% assisting load, the benefits are even more dramatic in that the FAST Actuator experiences a rate almost 2.3 times the no load rate, while only 24% of this rate is provided by the system pump, which is 55% of no load. The FAST Actuator delivers 65% more power than the conventional actuator, while the central system or pump flow demand remains at 55% of no load flow. However, it is to be noted that during the resisting portion of the load condition, the FAST Actuator delivers slightly less power than the conventional servoactuator which is caused by the pressure drop across the jet pump which is greater than the benefits produced by the jet pump while seeing only 55% of no load flow. If system requirements can live with this power curve, the pump required is 55% the size of a conventional system pump.

Figure 5:
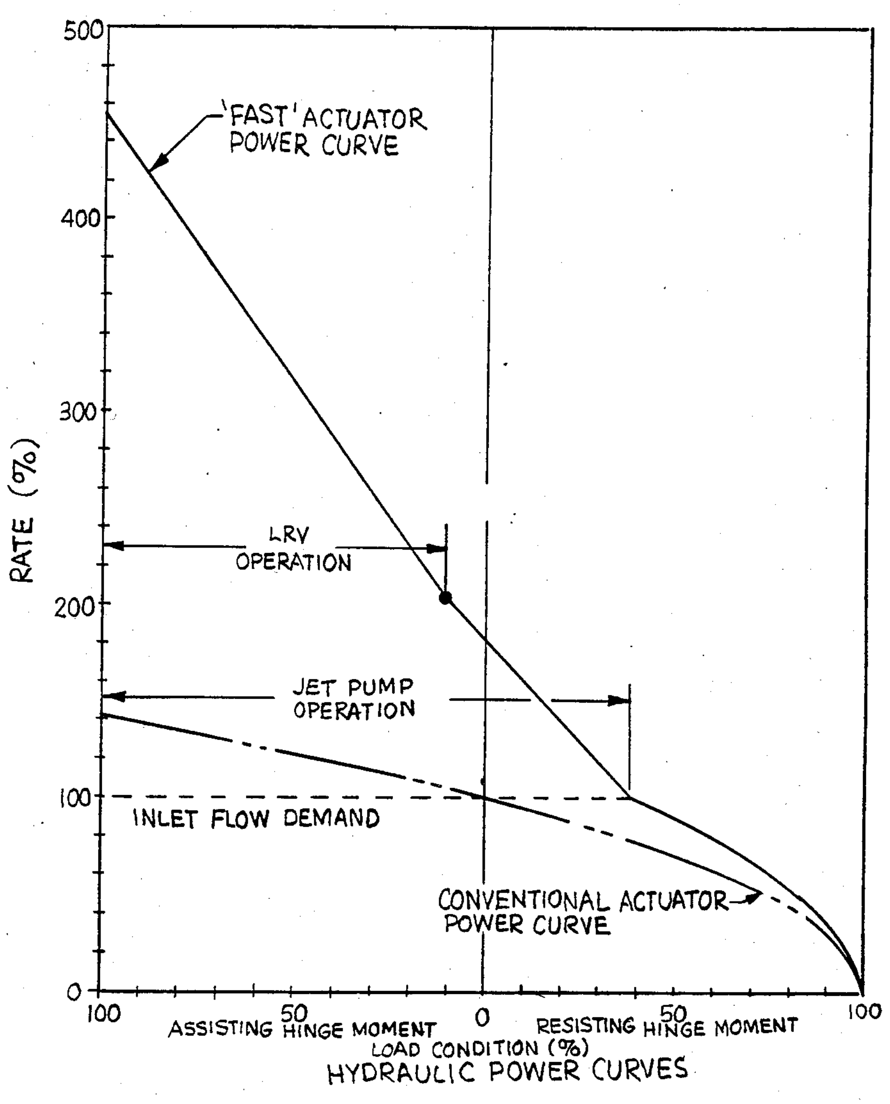
FIG. 5 shows the conventional servoactuator power curve versus the FAST Actuator power curve where the FAST Actuator has been sized to require the full system pump delivery at no load.

FIG. 5 compares the power curves when the same pump is used in both systems, i.e., both actuators consume the entire output of the pump at no load. The actuator rate increase of the FAST Actuator is clear. This type of actuator design study could be used for existing aircraft which have sufficient pump delivery but need higher flight control surface rates. Alternatively, a compromise design could also be selected whereby surface rates would be increased somewhat while at the same time reducing actuator pump inlet flow demand.

Figure 6:
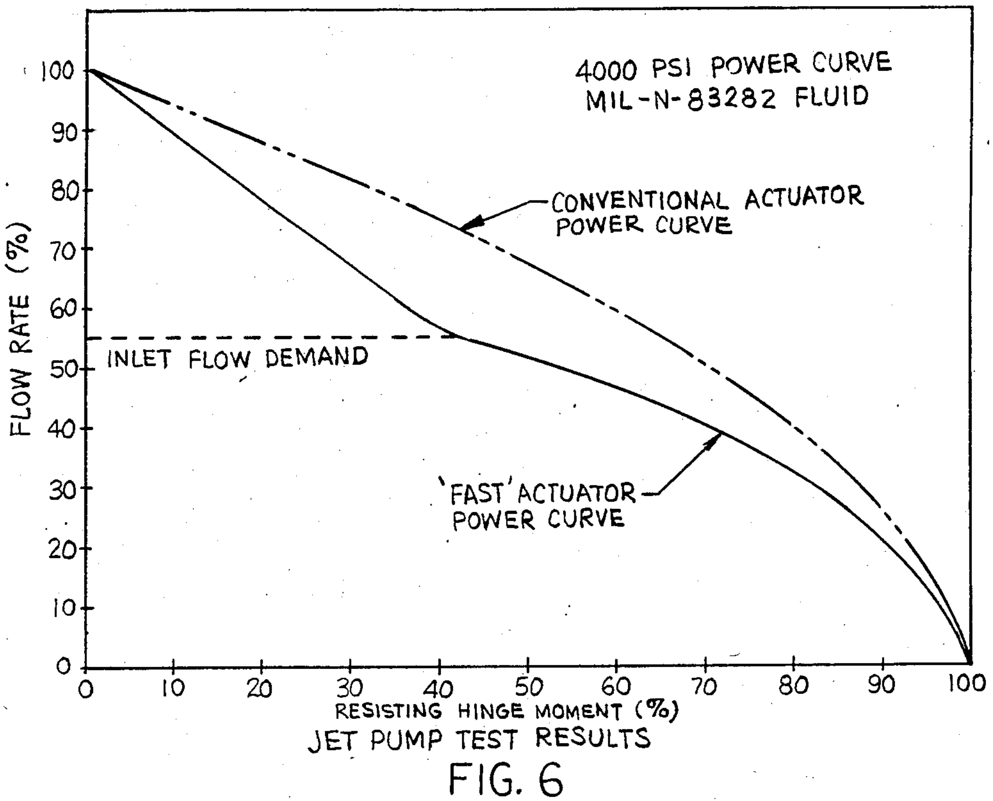
FIGS. 6 and 7 show jet pump test results for 4000 psi, MIL-H-H83282 hydraulic fluid and 8000 psi CPFE fluid, respectively.
Figure 7:
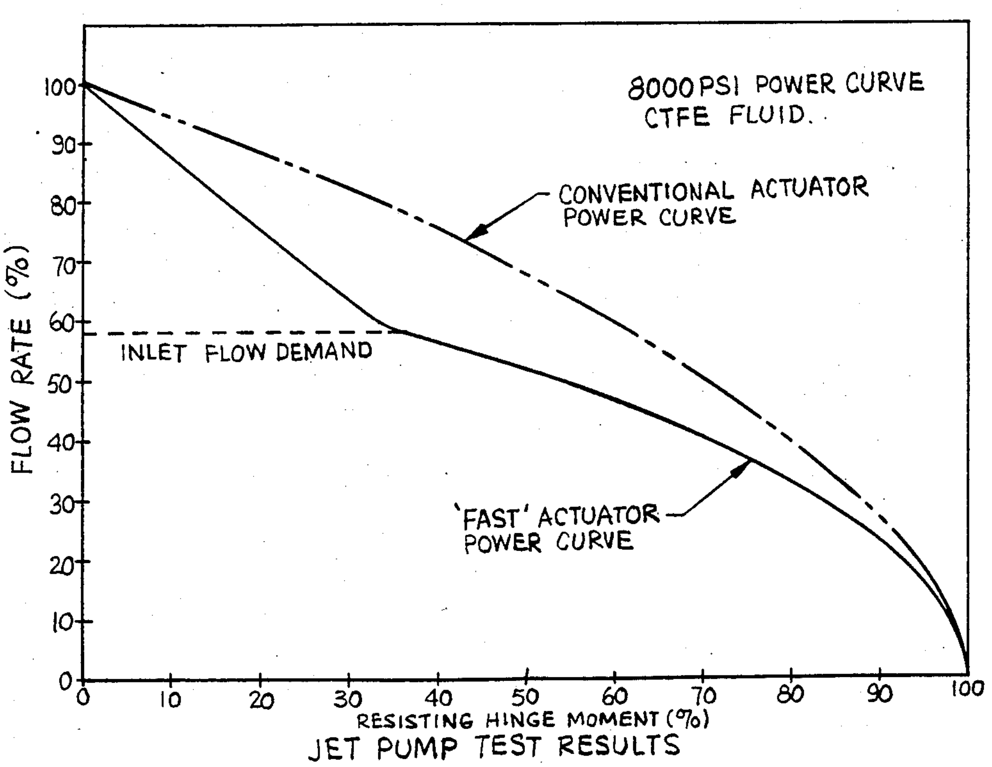
Figure 8:
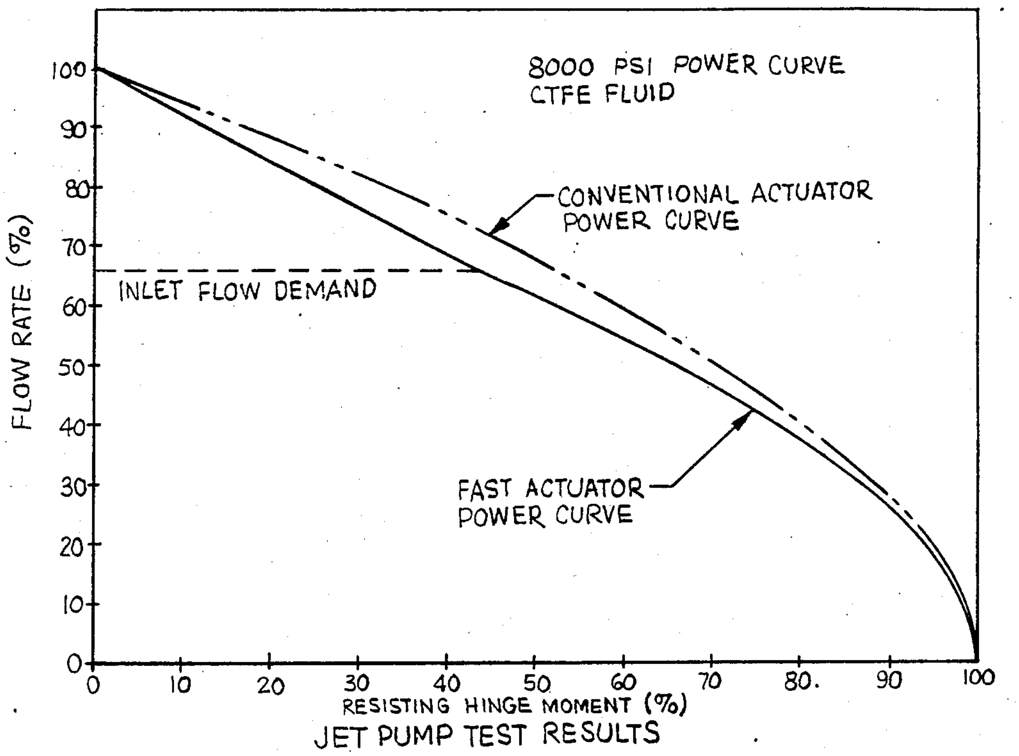
FIG. 8 shows jet pump performance as in FIG. 7 except the FAST Actuator inlet flow demand was increased to 66% of no load flow.
Figure 9:
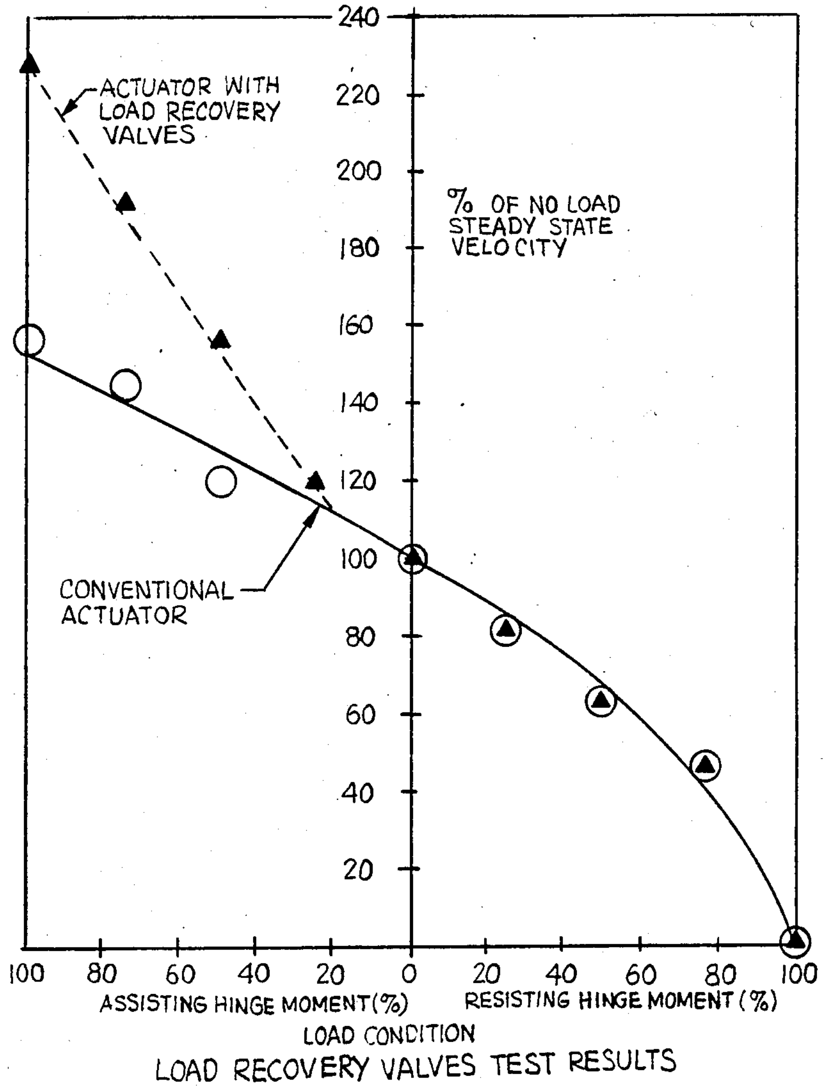
FIG. 9 shows the load recovery valve test results with CPFE hydraulic fluid at 8000 psi.

Further hardware verification tests were performed with MIL-H-83282 and CTFE fluids at 4000 and 8000 psi operating pressures. The jet pump test results are shown in FIGS. 6 and 7. FIG. 8 shows the jet pump performance improvement over that of FIG. 7 if the FAST Actuator inlet flow demand is increased from 55% to 66% of no load flow. Test results of the load recovery valves alone with CTFE fluid at 8000 psi are shown in FIG. 8.

It should now be reasonably clear that the flow can be augmented by bootstrap methods in a power actuator system by the addition of a jet pump to augment inlet flow with return flow by reducing the throat pressure in the jet pump below system return pressure and having a check valve in the augmented flow circuit to prevent back-flow during low flow rate conditions along with two load recovery check valves to short circuit the actuator during aiding load conditions.

What is claimed is:

1. In a fluid power actuator system having system pump pressure, system return, a control valve and having at least one power actuator having a pressure side and a return side which are interchangeable to drive loads in both directions, a boot-strap flow augmentation apparatus comprising:

- a jet pump having primary and secondary inlet ports and an outlet port located between said system pump and said control valve in said power actuator sytem and further oriented so that said primary port is connected to said system pump, said outlet port is connected to said control valve and said secondary port is connected to said system return;
- a first check valve located between said secondary port of said jet pump and said system return and oriented to permit flow from said return to said secondary port;
- a second check valve located upstream of said jet pump primary port and oriented to allow flow from said system pump to said jet pump; and
- means to permit flow between said return side of said power actuator and said pressure side of said power actuator when said return side pressure is higher than said pressure side pressure.

2. The boot-strap flow augmentation system of claim 1 wherein said means to permit flow between said return side of said power actuator and said pressure side of said power actuator when said return side pressure is higher than said pressure side pressure is connected so that said flow from said return side of said power actuator flows through said control valve to said pressure side of said power actuator.

3. The boot-strap flow augmentation system of claim 1 wherein said means to permit flow between said return side of said power actuator and said pressure side of said power actuator when said return side pressure is higher than said pressure side pressure is a bypass loop interconnecting said pressure side and said return side of said actuator through said control valve.

4. The boot-strap augmentation system of claim 3 further comprising at least one check valve which in combination with the control valve provides the logic which directs said flow between said return side and said pressure side of said power actuator when said return side pressure is higher than said pressure side pressure.

5. The boot-strap flow augmentation system of claim 3 further comprising two check valves which in combination with the control valve provide the logic which directs said flow between said return side and said pressure side of said power actuator when said return side pressure is higher than said pressure side pressure.

6. The boot-strap flow augmentation system of claim 3 wherein said bypass loop provides a direct path as well as second paths from said pressure side of said actuator through said control valve and from said return side of said actuator through said control valve to said bypass loop, with check valves oriented to prevent bypassing system pressure while allowing bypass flow of said return side pressure of said actuator when higher than said pressure side pressure and said bypass loop is also connected to said system return upstream of said secondary port of said jet pump.

7. The boot-strap flow augmentation system of claim 1 wherein said control valve has a pressure drop of less than 400 psid at no load flow for a system with a nominal pressure of 3000 psi.

8. In a hydraulic power actuator system having system pump pressure and system return, a boot-strap flow augmentation apparatus comprising:

- a jet pump having primary and secondary inlet ports and an outlet port oriented so that said primary port is connected to said system pump;
- a servo control valve having a pressure port, first and second load ports and first and second return ports, said pressure port connected to said jet pump outlet port;
- at least one power actuator having a first side and a second side which are connected to said first and second load ports of said control valve;
- a first check valve connected between said secondary port of said jet pump and said system return and oriented to permit flow from said return to said secondary port;
- a second check valve located upstream of said jet pump primary inlet and oriented to allow flow from said system pump to said jet pump;
- a by-pass loop connecting said first and second sides of said power actuator with connection to said first and second return ports of said servo control valve and connection to said system return upstream of said first check valve; and
- load recovery check valves in said by-pass loop between said first side of said actuator and said first return port of said control valve and between said second side of said actuator and said second return port of said control valve oriented to prevent direct by-pass of said system pressure while permitting by-pass of said return system pressure when higher than said system pressure.

* * * * *